(12) United States Patent
Miyazaki et al.

(10) Patent No.: US 8,643,803 B2
(45) Date of Patent: Feb. 4, 2014

(54) LIQUID CRYSTAL DISPLAY DEVICE

(75) Inventors: Hiroyuki Miyazaki, Mutsuzawa (JP);
Akio Miyauchi, Mobara (JP); Nobuyuki Koganezawa, Chiba (JP)

(73) Assignee: Japan Display Inc., Tokyo (JP)

( * ) Notice: Subject to any disclaimer, the term of this patent is extended or adjusted under 35 U.S.C. 154(b) by 49 days.

(21) Appl. No.: 13/409,313

(22) Filed: Mar. 1, 2012

(65) Prior Publication Data
US 2012/0224117 A1 Sep. 6, 2012

(30) Foreign Application Priority Data

Mar. 4, 2011 (JP) ................................. 2011-047096

(51) Int. Cl.
*G02F 1/1333* (2006.01)
(52) U.S. Cl.
USPC .................. 349/58; 349/61; 349/65; 345/102; 362/276; 362/632
(58) Field of Classification Search
None
See application file for complete search history.

(56) References Cited

U.S. PATENT DOCUMENTS 7,667,789 B2 * 2/2010 Choi et al. ...................... 349/65

FOREIGN PATENT DOCUMENTS

JP 2000-315596 11/2000

* cited by examiner

*Primary Examiner* — Richard Kim
(74) *Attorney, Agent, or Firm* — Antonelli, Terry, Stout & Kraus, LLP.

(57) ABSTRACT

The liquid crystal display device is a liquid crystal display device having: a light guide plate for converting light from a light source into backlight for illumination; a first frame for containing the light guide plate; and a liquid crystal display panel provided over said light guide plate, wherein the liquid crystal display device further has a photosensor that is placed so as to face a sidewall of the light guide plate and detect an amount of the backlight, and the photosensor is placed so as to face the sidewall of the light guide plate through a hole or a notch created in a sidewall portion of the first frame.

6 Claims, 11 Drawing Sheets

PRIOR ART

PRIOR ART

PRIOR ART

LIQUID CRYSTAL DISPLAY DEVICE

CROSS-REFERENCE TO RELATED APPLICATION

The present application claims priority over Japanese application JP 2011-047096 filed on Mar. 4, 2011, the contents of which are hereby incorporated into this application by reference.

BACKGROUND OF THE INVENTION (1) Field of the Invention

The present invention relates to a liquid crystal display device, and in particular, to a liquid crystal display device having a photosensor for measuring the amount of backlight.

(2) Description of the Related Art

In recent years, some liquid crystal display devices have a photosensor in the backlight unit or in the liquid crystal display panel in order to maintain the liquid crystal display device at an arbitrary brightness. These liquid crystal display devices have such a structure that the amount of light from the light source is controlled and the backlight for illuminating the liquid crystal display panel from the backlight unit provided on the rear side of the liquid crystal display panel is kept constant.

In these liquid crystal display devices, the photosensor is generally provided in a periphery portion of the liquid crystal display device or on the rear side of the light guide plate in order to nullify the effects of the external light entering through the display surface of the liquid crystal display panel.

Examples of the liquid crystal display device where a photosensor is provided on the rear side include the illumination device and the display device in JP 2000-315596A. In the illumination device and the display device in JP 2000-315596A, a brightness sensor (photosensor) is provided at the bottom of the casing (lower frame) for containing a light guide plate and a discharge lamp that works as the light source, and the brightness of the backlight is measured in the structure.

SUMMARY OF THE INVENTION

In the structure according to the technology in JP 2000-315596A, lead lines from the photosensor are drawn out to the outside, that is to say, to the lower side of the lower frame, and therefore, the structure requires a region for drawing out the lead lines, even in a case where the power source substrate is not provided on the rear side of the liquid crystal display device, which causes such a problem that the thickness of the backlight unit, that is to say, the thickness of the liquid crystal display device, is great.

Furthermore, a reflective sheet is provided on the rear side of the light guide plate, and the structure allows this reflective sheet to reflect light emitted from the rear side of the light guide plate so that the light returns to the light guide plate in order to increase the efficiency of the use of light from the light source. In addition, a pattern for converting light that has entered through a sidewall of the light guide plate into surface backlight having a uniform distribution of brightness is formed on the rear side of the light guide plate. Therefore, there is a concern that the backlight may be inconsistent in the case where an opening is provided in part of the reflective sheet because light is not reflected from this opening, which would make the light reflected from the rear side inconsistent.

In order to solve this problem, as shown in FIG. 12, there is a method for providing a photosensor PD inside the lower frame LF so that a detection signal from the photosensor PD can be drawn out to the outside via lead lines (photosensor substrate) FSC made of a flexible printed circuit board, and thus can be connected to the connector CN of the power supply circuit PCB. As shown in FIG. 13, which shows an enlargement of portion E in FIG. 12 and FIG. 14, which is a cross-sectional diagram along line F-F' in FIG. 12, this liquid crystal display device has such a structure as to contain the photosensor PD, the light guide plate LG, the reflective sheet MS and the optical sheet OS together with the mold member (inner mold) IM formed inside the lower frame LF. In this conventional liquid crystal display device, the photosensor PD is placed in such a location as to face a sidewall of the light guide plate LG with a predetermined amount of clearance L4.

The flexible printed circuit board (photosensor substrate) FSC on which the photosensor PD is mounted is fixed to a sidewall of the inner mold IM by means of a two-sided adhesive tape DFT, and thus, the photosensor PD is fixed to a predetermined location in the structure. The other side of the photosensor substrate FSC is lead out through a hole for drawing out wires created at the bottom of the lower frame LF so as to be connected to the power supply circuit PCB together with the flexible printed circuit board FPC from the liquid crystal display panel LCD in the structure. Here, the flexible printed circuit board FPC is wired in a region between the middle frame MF and the upper frame UF so as to electrically connect the power supply circuit PCB to the liquid crystal display panel LCD that is fixed to the middle frame MF by means of an adhesive tape AD.

In the case where the frame portion of the middle frame MF cannot be formed so as to cover the light guide plate LG from end to end, it is known that there is a defect in the display such that a peripheral portion of the light guide plate LG is visible in stripe form through the opening of the liquid crystal display device, that is to say, through the opening in the upper frame UF.

Therefore, it is necessary for the conventional liquid crystal display device to have a space for containing a photosensor PD in a side portion of the light guide plate LG, which causes such a problem that the region from the ends of the display region of the liquid crystal display panel LCD to the periphery portions of the liquid crystal display device, a so-called frame region, is great. Furthermore, there is a concern that dust may enter into the backlight unit through the hole for drawing out wires provided in the lower frame LF.

It is also possible to create a recess that corresponds to the protrusion of the photosensor PD in the light guide plate LG. In the case where the form of the peripheral portions of the light guide plate LG is not uniform, however, a uniform light emitting process cannot be carried out, which makes the backlight inconsistent, and thus there is a concern that the display quality may be low.

The present invention is provided in view of these problems, and an object of the present invention is to provide a liquid crystal display device where it is possible to make the frame region where a photosensor is provided smaller.

(1) In order to solve the above-described problems, the liquid crystal display device according to the present invention is a liquid crystal display device having: a light guide plate for converting light from a light source into backlight for illumination; a first frame for containing the above-described light guide plate; and a liquid crystal display panel provided over said light guide plate, wherein the liquid crystal display device further has a photosensor that is placed so as to face a sidewall of the above-described light guide plate and detect an amount of the above-described backlight, and the above-described photosensor is placed so as to face the sidewall of the above-described light guide plate through a hole or a notch created in a sidewall portion of the above-described first frame.

(2) In order to solve the above-described problems, the liquid crystal display device according to the present invention is the liquid crystal display device according to (1), wherein the liquid crystal display device further has a second frame having a frame portion in frame form that extends from the periphery to a first surface so that an opening through which the above-described backlight for illumination is emitted is created, and a second surface that faces the above-described first surface is defined as an opening along a sidewall portion, the above-described second frame has a hole or a notch in a sidewall portion that is connected to the hole or the notch in the sidewall portion of the above-described first frame when the above-described first frame and the above-described second frame are engaged with each other, and the above-described photosensor is placed so as to face the sidewall of the above-described light guide plate through the hole or the notch that passes through the sidewall portions of the above-described first and second frames.

(3) In order to solve the above-described problems, the liquid crystal display device according to the present invention is the liquid crystal display device according to (1) or (2), wherein the liquid crystal display device further has a flexible printed circuit board for inputting a video signal to the above-described liquid crystal display panel, and the above-described photosensor is placed on the above-described flexible printed circuit board.

(4) In order to solve the above-described problems, the liquid crystal display device according to the present invention is the liquid crystal display device according to (3), wherein the above-described flexible printed circuit board is fixed to a sidewall portion of the above-described first or second frame by means of an adhesive.

(5) In order to solve the above-described problems, the liquid crystal display device according to the present invention is the liquid crystal display device according to any of (1) to (4), wherein the detection side of the above-described photosensor is placed in the above-described hole or the above-described notch.

(6) In order to solve the above-described problems, the liquid crystal display device according to the present invention is the liquid crystal display device according to any of (1) to (5), wherein the above-described light source is placed so as to face a sidewall of the above-described light guide plate, and the above-described photosensor is placed in a sidewall of the above-described light guide plate that is different from the sidewall where the above-described light source is placed.

According to the present invention, the frame region where a photosensor is placed can be made smaller.

Other effects of the present invention will be clarified from the descriptions of the entirety of the specification.

DESCRIPTION OF THE EMBODIMENTS

In the following, the embodiments according to the present invention are described in reference to the drawings. Here, the same symbols are attached to the same components, and the same descriptions are not repeated in the following.

<First Embodiment>

Figure 1:
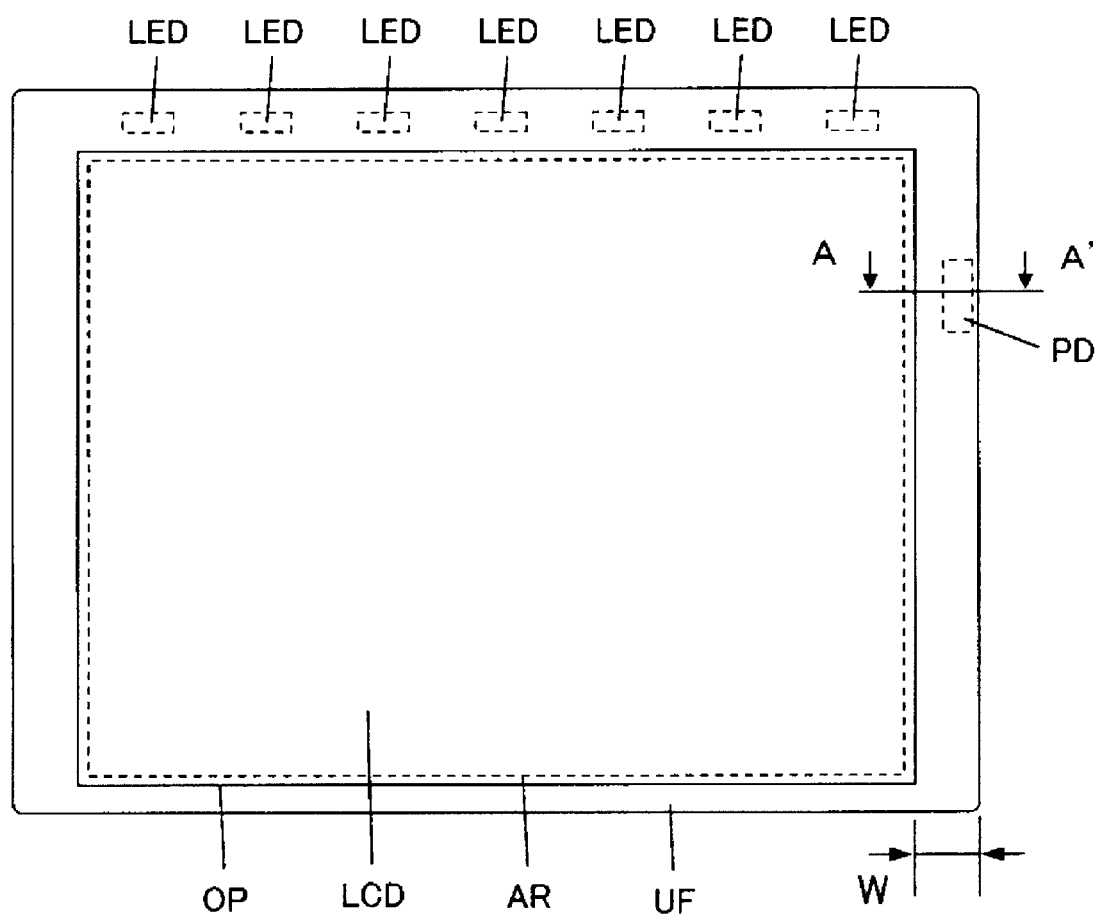
FIG. 1 is a top diagram for schematically illustrating the structure of the liquid crystal display device according to the first embodiment of the present invention.

FIG. 1 is a top diagram for schematically illustrating the structure of the liquid crystal display device according to the first embodiment of the present invention, where the top diagram is a plan diagram as viewed from the display surface side. In the following, the liquid crystal display device according to the first embodiment is described in reference to FIG. 1. In the following description, the mold member (inner mold) formed inside the lower frame LF is omitted in order to simplify the explanation.

As shown in FIG. 1, the liquid crystal display device according to the first embodiment has such a structure that the display surface of the liquid crystal display panel LCD is exposed from an opening OP created in the upper frame UF in box form, and the region indicated by the dotted line is the display area AR where pixels for display are arranged in a matrix. In particular, in the liquid crystal display device according to the first embodiment, the upper frame UF is formed of a metal member, and in the frame region (frame portion), which is the region ranging from the outer periphery to the end of the opening OP, as described below in detail, drive circuits mounted on a substrate of the liquid crystal display panel LCD, light emitting diodes LED that provide the light source for the backlight unit, and a flexible printed circuit board for electrically connecting the power supply circuit for supplying control signals and the power supply for the drive circuit to the liquid crystal display panel LCD are provided. In this structure, the liquid crystal display panel LCD formed of a glass substrate is protected, and members placed in the region excluding the display area AR are contained. Here, the structure of the liquid crystal display panel LCD is the same as the conventional structure, and there is no limitation on the method for driving the liquid crystal display panel.

In addition, in the liquid crystal display device according to the first embodiment, as indicated by the dotted lines in FIG. 1, light emitting diodes LED are mounted in the upper side portion of the frame region, and a photosensor PD is provided in another side portion adjacent to the side portion in which the light emitting diodes LED are mounted (the light side portion in FIG. 1 where the width of the frame region is W). Here, the photosensor PD has a structure using a well-known photodiode, but there is no limitation to this.

Figure 2:
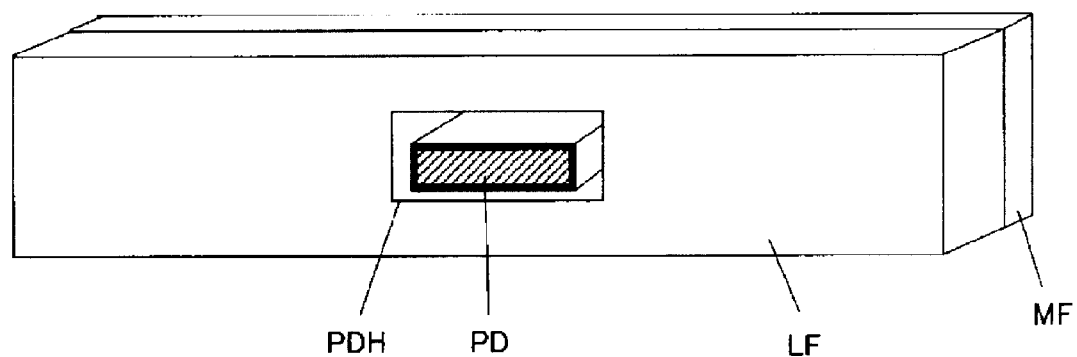
FIG. 2 is a diagram showing an enlargement for illustrating the state where a photosensor PD is attached in the liquid crystal display device according to the first embodiment of the present invention.

FIG. 2 is a diagram showing an enlargement of the photosensor PD in an attached state in the liquid crystal display device according to the first embodiment of the present invention, and in particular, is a perspective diagram as viewed from the light guide plate side that is provided on the rear side of the liquid crystal display panel LCD.

As is clear from FIG. 2, in the liquid crystal display device according to the first embodiment, a hole (sensor hole) PDH is created in a side wall portion of the lower frame (first frame) LF for containing the backlight unit, and at the same time, a sensor hole PDH is created in a side wall portion of the middle frame (second frame) MF. These two holes (sensor hole PDH) are created in the same location in a state where the middle frame MF is engaged with the lower frame LF and make a through hole from the sidewall on the outside of the middle frame MF to the sidewall on the inside of the lower frame LF. The photosensor PD is located in the sensor hole PDH created in the lower frame LF and the middle frame MF in the structure so as to face towards the inner surface of the lower frame LF from the outer surface of the middle frame MF. At this time, the light detecting surface of the photosensor PD is on the inside of the lower frame LF, that is to say, on the light guide plate side, which is not shown.

Figure 3:
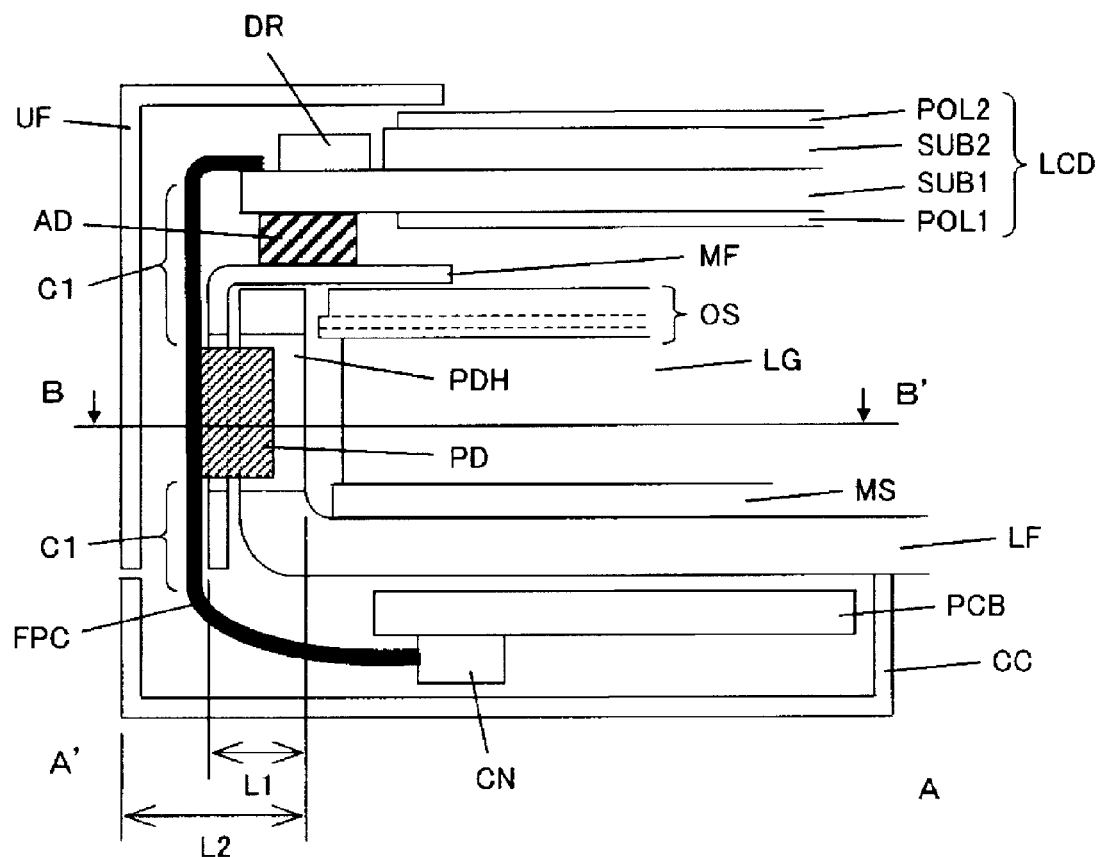
FIG. 3 is a cross-sectional diagram for illustrating the structure of the portion where a photosensor is attached in the liquid crystal display device according to the first embodiment of the present invention.

Next, FIG. 3 is a cross-sectional diagram for illustrating the structure of the portion to which the photosensor is attached in the liquid crystal display device according to the first embodiment of the present invention, which is the cross-section along line A-A' in FIG. 1. In the following, the portion to which the photosensor PD is attached in the liquid crystal display device according to the first embodiment is described in detail in reference to FIG. 3. Here, fixture members for fixing the light guide plate LG and the components, such as the inner mold, are omitted in the following description.

In the liquid crystal display device according to the first embodiment, as shown in FIG. 3, the two frame members made of a lower frame LF that also functions as a radiator plate for the light source, not shown, and a middle frame MF are engaged and integrated so as to form a backlight unit in the structure. In addition, in the liquid crystal display device according to the first embodiment, the lower frame LF and the middle frame MF are formed approximately quadrilateral, and the sidewall portion of the middle frame MF is engaged in the sidewall portion of the lower frame LF so that they are integrated to form a backlight unit. At this time, in the liquid crystal display device according to the first embodiment, the middle frame MF is engaged in the lower frame LF so that the middle frame MF is fixed to the lower frame LF to form a backlight unit. In addition, the outer shape of the lower frame LF is smaller than the outer shape of the middle frame MF in the structure according to the first embodiment.

That is to say, the lower frame LF is formed of an approximately quadrilateral metal member in box form where one flat portion (first side) has an opening along the sidewalls and the other flat portion (second side) is closed, and the structure functions as a radiator plate for the light source, not shown, and at the same time, prevents a foreign substance, such as dust, from entering inside. A reflective sheet MS, a light guide plate LG and an optical sheet OS, such as a diffusion sheet, are provided (contained) in order within the lower frame LF starting from the second side.

The middle frame MF is formed so as to have a frame region (frame portion) where one flat portion has an opening along the sidewalls and the other flat portion extends from the sidewalls and an opening that becomes a window portion through which the backlight that has converted to light from a plane by means of the light guide plate LG passes. At this time, the opening created on the other surface of the middle frame MF is smaller than the outer periphery of the light guide plate LG.

The sidewalls of the lower frame LF and the sidewalls of the middle frame MF are perpendicular to the respective flat portions (flat portions on the second sides), and when the flat portions with openings of the lower frame LF and the middle frame MF are made to face each other, the middle frame MF can be engaged into the lower frame LF in the structure. Thus, the lower frame LF and the middle frame MF are engaged so that the reflective sheet MS, the light guide plate LG and the optical sheet OS contained in the lower frame LF are held within this lower frame LF.

In addition, the liquid crystal display panel LCD is provided on the outer side of the flat portion on the second side of the middle frame MF, that is to say, on the side illuminated with the backlight in the structure. The liquid crystal display panel LCD is formed of a first substrate SUB1 on which thin film transistors, not shown, are formed, a second substrate SUB2 provided so as to face the first substrate SUB1 through a liquid crystal layer, not shown, polarizing plates POL1 and POL2 that are respectively provided on the surface of the first substrate SUB1 and the second substrate SUB2 on the side that does not face the liquid crystal layer, and a driving circuit DR mounted on the side portion of the first substrate SUB1, which is greater than the second substrate SUB2. In particular, the liquid crystal display device according to the first embodiment has such a structure that the backlight unit is provided on the first substrate SUB1 side, and the first substrate SUB1 and the frame region of the middle frame MF are fixed together using an adhesive tape AD.

In addition, the liquid crystal display device according to the first embodiment is provided with an upper frame UF that covers the area outside the display area AR of the liquid crystal display panel LCD and prevents a foreign substance, such as dust, from entering inside. A first flat portion of the upper frame UF has an opening along the sidewalls and a second flat portion has a frame region that extends from the sidewalls, and an opening that becomes a window through which the display image on the display area AR passes in the structure. At this time, the opening created in the second flat portion of the upper frame UF is smaller than the outer periphery of the liquid crystal display panel LCD and greater than the display area AR.

In addition, the liquid crystal display device according to the first embodiment is provided with a driving circuit DR mounted on the side portion of the liquid crystal display panel LCD and a power supply circuit PCB for supplying a control signal and the like to pixels. The power supply circuit PCB is provided on the rear side of the liquid crystal display device, that is to say, on the side opposite to the display side, and in particular, is mounted on the outer surface of the lower frame LF. At this time, the power supply circuit PCB is covered by a substrate cover CC in the structure according to the first embodiment.

The power supply circuit PCB and the liquid crystal display panel LCD are electrically connected via the flexible printed circuit board FPC. At this time, one end of the flexible printed circuit board FPC is connected to a connector CN of the power supply circuit PCB, and the other end of the flexible printed circuit board FPC is connected to a connection terminal portion, not shown, formed on a side portion of the liquid crystal display panel LCD.

Figure 4:
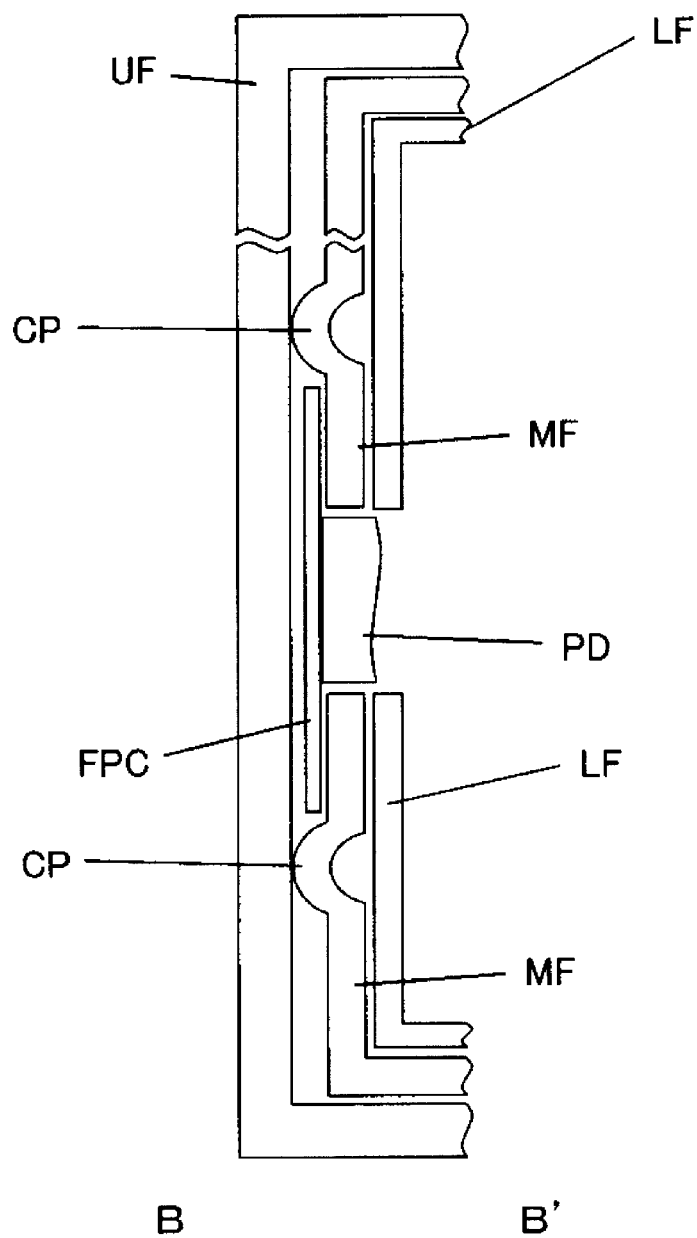
FIG. 4 is a cross-sectional diagram along line B-B' in FIG. 3.

This flexible printed circuit board FPC connects the liquid crystal display panel LCD provided on the outside of the lower frame LF and the middle frame MF to the power supply circuit PCB in the structure, and therefore is provided in a region between the sidewalls of the upper frame UP and the sidewalls of the middle frame MF. In particular, in the liquid crystal display device according to the first embodiment, as shown in FIG. 4, which is a cross-sectional diagram along line B-B' in FIG. 3, a protrusion CP protruding to the outside from a sidewall (on the sidewall side of the upper frame) is formed on a sidewall of the middle frame MF in order to reduce the force applied to the flexible printed circuit board FPC. By providing this protrusion CP, it is possible to maintain the clearance (distance) between the sidewall portion of the upper frame UF and the sidewall portion of the middle frame MF at a clearance corresponding to amount by which the protrusion CP protrudes. As a result, it is possible to prevent the flexible printed circuit board FPC from being damaged at the time of assembly and use.

In addition, in the liquid crystal display device according to the first embodiment, the photosensor PD is provided on the flexible printed circuit board FPC on the side facing the middle frame MF. A hole (sensor hole) PDH is created in the respective sidewall portions of the middle frame MF and the lower frame LF in the location where the photosensor PD is placed. In this structure, as shown in FIG. 3, it is possible to provide the photosensor PD that protrudes from the flexible printed circuit board FPC in the sensor hole PDH.

In the liquid crystal display device according to the first embodiment, the thickness of the sidewall portion of the upper frame UF is 0.3 mm; the thickness of the sidewall portion of the middle frame MF is 0.4 mm; the thickness of the sidewall portion of the lower frame LF is 1.5 mm; the clearance, that is to say, the distance between the upper frame UF and the middle frame MF, is 1.0 mm; and the clearance between the middle frame MF and the lower frame LF is 0.1 mm.

Accordingly, the distance L1 between the sidewall on the outside of the middle frame MF and the sidewall on the inside of the lower frame LF is the sum of the thickness of the sidewall portion of the middle frame MF, the thickness of the sidewall portion of the lower frame LF, and the clearance between the middle frame MF and the lower frame LF, which is L1=0.4+0.1+1.5=2.0 mm. Meanwhile, the thickness of the photosensor PD, that is to say, the amount of the protrusion from the flexible printed circuit board FPC is 1.6 mm.

As a result, the end portion of the photosensor PD is located in the sensor hole PDH created in the middle frame MF and the lower frame LF, that is to say, it does not protrude from the sidewall on the inside of the lower frame LF in the structure. Therefore, the distance between the sidewall portion of the lower frame LF and the light guide plate LG is enough, as long as the clearance corresponds to the amount of change of the lower frame LF and the light guide plate LG due to thermal expansion.

At this time, in the liquid crystal display device according to the first embodiment, the end surface of the photosensor PD is located in the sensor hole PDH created in the lower frame LF, and therefore, it is possible to gain such particular effects that external light entering through the display side of the liquid crystal display panel LCD can be prevented from easily entering into the photosensor PD. Furthermore, the location at which the photosensor PD is attached can be determined based on the location of the sensor hole PHD created in the lower frame LF and the middle frame MF, and therefore, such particular effects can be gained that the photosensor PD can be easily positioned within the plane on the sidewall, and the positioning between the photosensor PD and the light guide plate LG can be easily achieved.

In addition, in the liquid crystal display device according to the first embodiment, the sidewall portion of the upper frame UF is formed on the outside of the sidewall portion of the middle frame MF, and therefore, the distance L2 between the sidewall portion of the liquid crystal display device (that is to say, the sidewall on the outside of the upper frame UF) and the sidewall on the inside of the lower frame LF in a side portion where the photosensor PD is provided is the sum of the thickness of the sidewall portion of the upper frame UF, the clearance between the upper frame UP and the middle frame MF, and the distance L1, which is L2=0.3+1.0+L1=0.3+1.0+2.0=3.3 mm.

That is to say, even in the case where a photosensor PD is provided in a side portion in the liquid crystal display device according to the first embodiment, it is possible to form a frame region of the liquid crystal display device with the same distance (width) L2 as in the case where no photosensor PD is provided.

Figure 12:
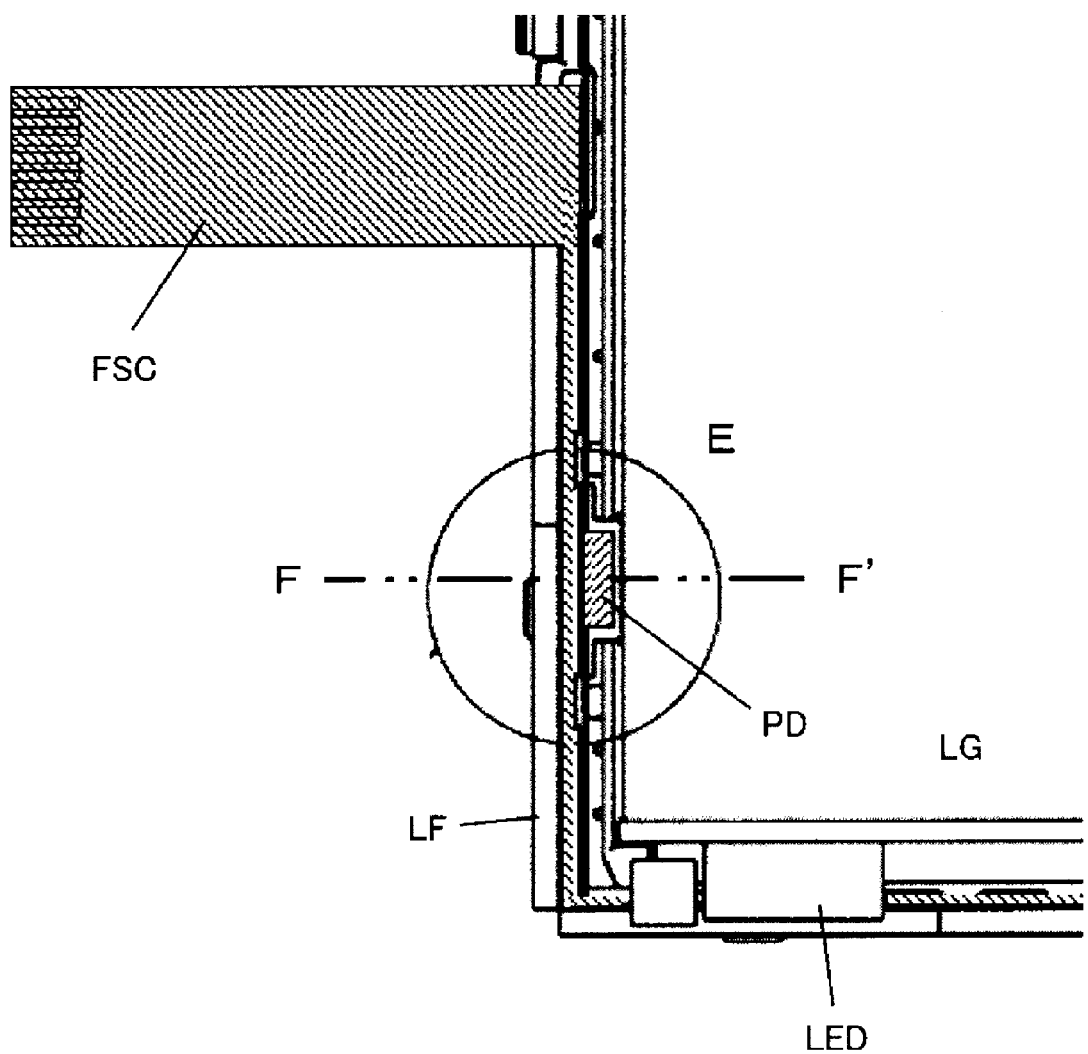
FIG. 12 is a cross-sectional diagram for illustrating the structure of the portion to which a photosensor is attached in a conventional liquid crystal display device.
Figure 13:
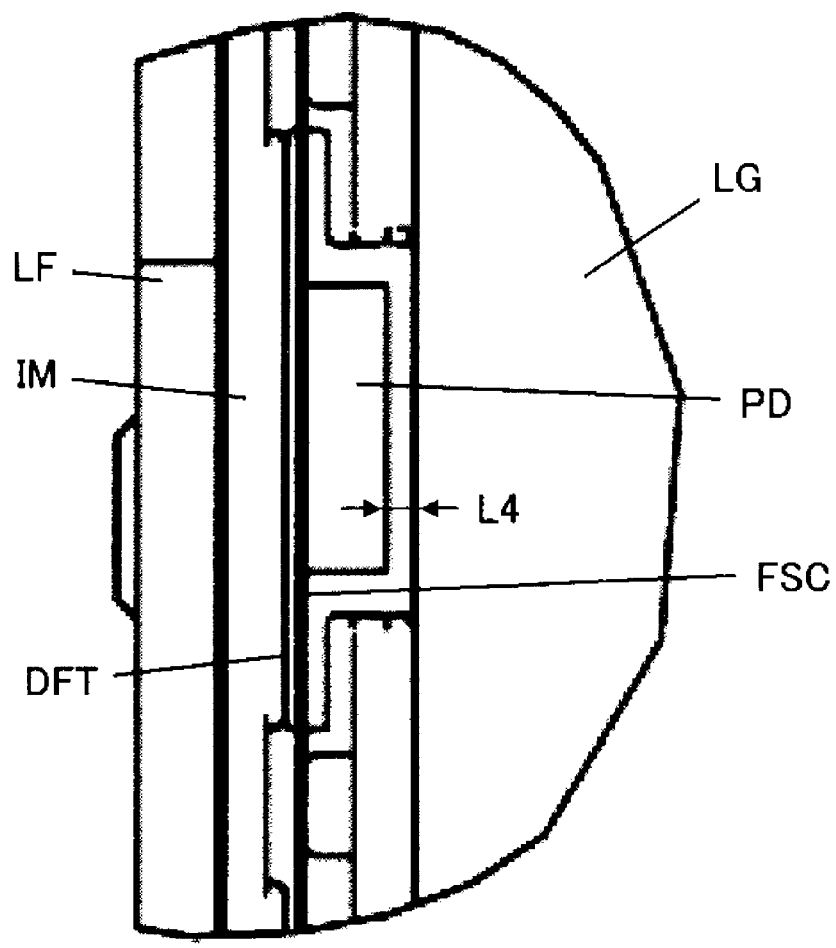
FIG. 13 is a diagram showing an enlargement of portion E in FIG. 12.
Figure 14:
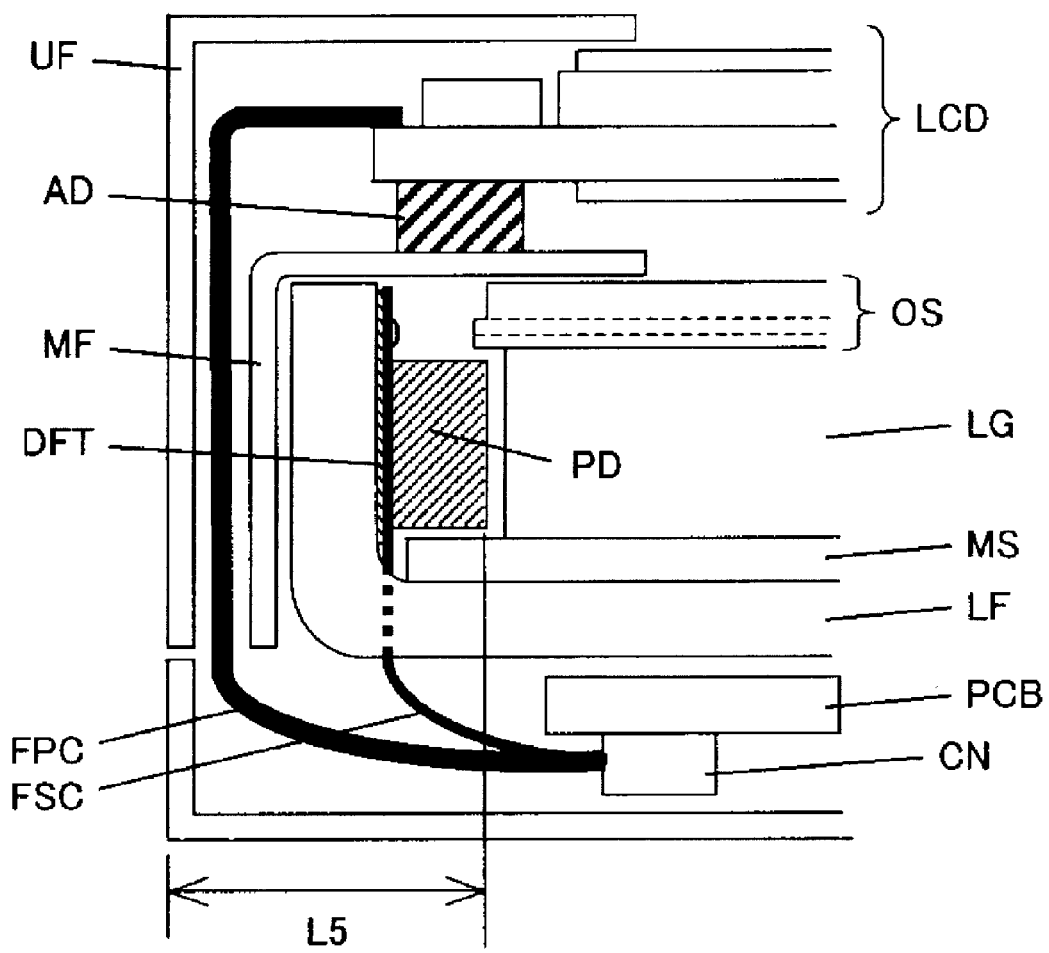
FIG. 14 is a cross-sectional diagram for illustrating the structure of the portion to which a photosensor is attached in a conventional liquid crystal display device.

Meanwhile, as shown in the above-described FIGS. 12 to 14, a photosensor PD is provided within the lower frame LF in the structure of the conventional liquid crystal display device, and therefore, the additional thickness 0.2 mm, which is the sum of the thickness 1.6 mm of the photosensor PD, the thickness of the lead line for the photosensor PD (flexible printed circuit board) and the thickness of the two-sided adhesive tape, is necessary. Therefore, it is necessary for the frame region to be greater at least by the amount that corresponds to 1.6+0.2=1.8 mm, even in the case where a frame member having the same structure as in the liquid crystal display device according to the first embodiment is used. That is to say, it is possible to make the frame region smaller by at least 1.8 mm in the liquid crystal display device according to the first embodiment in comparison with the conventional liquid crystal display device. At this time, as shown in FIG. 14, the distance L5 between the outside of the sidewall portion of the conventional liquid crystal display device and the end of the photosensor PD is L5=L2+1.6+0.2=5.1 mm. Accordingly, the width of the frame region in the liquid crystal display device according to the first embodiment can be made smaller by 35% or more in comparison with the conventional liquid crystal display device.

Furthermore, in the liquid crystal display device according to the first embodiment, signal lines for the photosensor PD can be formed in the region C1 on the flexible printed circuit board, that is to say, on the liquid crystal display panel LCD side of the photosensor PD (upper side in FIG. 3) and on the power supply circuit PCB side (lower side in FIG. 3). Accordingly, the thickness of the backlight unit can be prevented from increasing as the photosensor PD is mounted. Thus, such particular effects can be gained that the thickness can be reduced in comparison with the conventional liquid crystal display device on which a photosensor PD is mounted.

Figure 5:
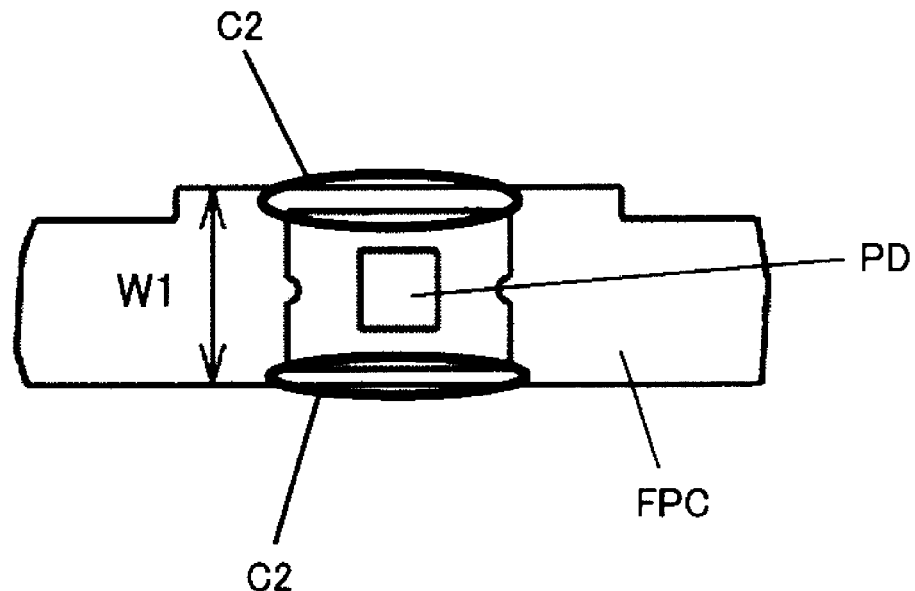
FIG. 5 is a diagram for schematically illustrating the structure of the flexible printed circuit board FPC in the liquid crystal display device according to the first embodiment of the present invention.

FIG. 5 is a diagram for schematically illustrating the structure of the flexible printed circuit board FPC in the liquid crystal display device according to the first embodiment of the present invention, which is a flexible printed circuit board FPC on which a photosensor PD is mounted.

As shown in FIG. 5, the flexible printed circuit board FPC according to the first embodiment is formed such that the width of the flexible printed circuit board FPC (W1 in FIG. 5) in the region where the photosensor PD is mounted in the center portion in the figure is greater than the width of a connector CN and a terminal to be connected to the connection terminal of the liquid crystal display panel LCD. In the region where this photosensor PD is mounted, signal wires for connecting the power supply circuit PCB and the liquid crystal display panel LCD are formed in the region represented by C2 in the figure.

Here, the region where signal wires for connecting the power supply circuit PCB and the liquid crystal display panel LCD are formed is not limited to this, but may have such a configuration that a flexible printed circuit board FPC having multilayer wires is used so as to be layered on the region where the photosensor PD is mounted or signal wires are formed on the surface on the side opposite to the surface on which the photosensor PD is mounted, for example.

In addition, though the flexible printed circuit board FPC according to the first embodiment is expanded only in one direction (upwards in the figure) from among the two directions along the width (upwards and downwards in the figure) to form signal wires on the two sides of the region on which the photosensor PD is mounted (upwards and downwards in the figure), the flexible printed circuit board FPC may be expanded in the two directions (upwards and downwards in the figure) in the structure.

Figure 6:
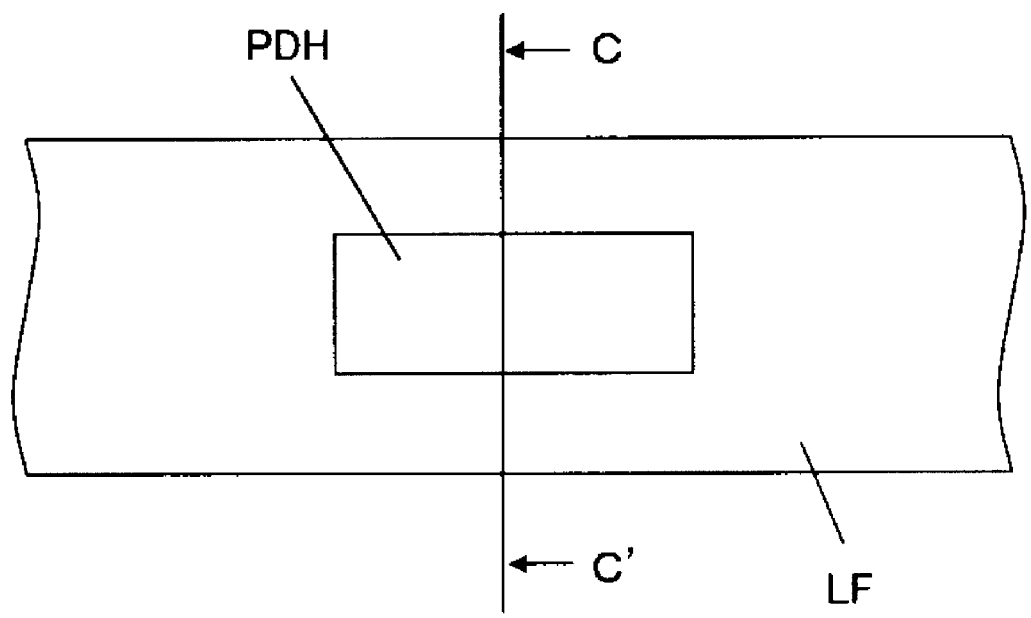
Figure 7:
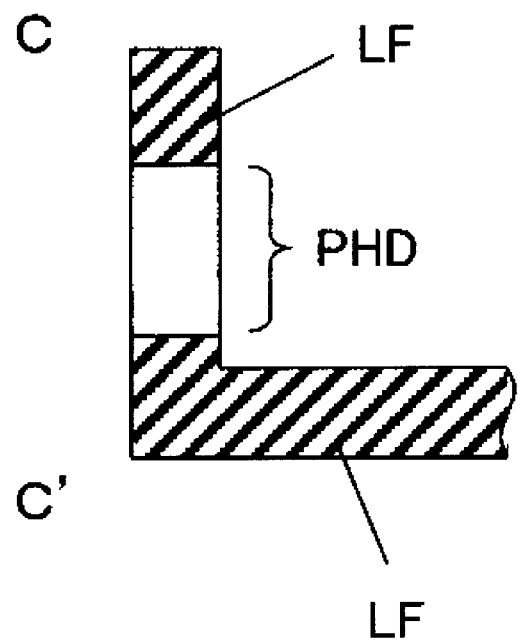
FIG. 7 is a cross-sectional diagram along line C-C' in FIG. 6.

FIG. 6 is a diagram showing an enlargement of the sensor hole portion created in the lower frame in the liquid crystal display device according to the first embodiment of the present invention, and FIG. 7 is a cross-sectional diagram along line C-C' in FIG. 6. Here, the middle frame MF has the same sensor hole PDH as in the lower frame LF, and therefore, the lower frame LF is described below in detail.

In the liquid crystal display device according to the first embodiment, as shown in FIG. 6, a sensor hole PDH is created in the sidewall portion corresponding to the location in which the photosensor PD is provided. As shown in FIG. 7, this sensor hole PDH penetrates the sidewall portion of the lower frame LF in the structure. Here, a sensor hole PDH similar to the sensor hole PDH shown in FIGS. 6 and 7 is created in the sidewall portion of the middle frame MF. As shown in FIG. 2, this structure allows the photosensor PD to be placed between the sidewall on the outside of the middle frame MF and the sidewall on the inside of the lower frame LF.

Figure 8:
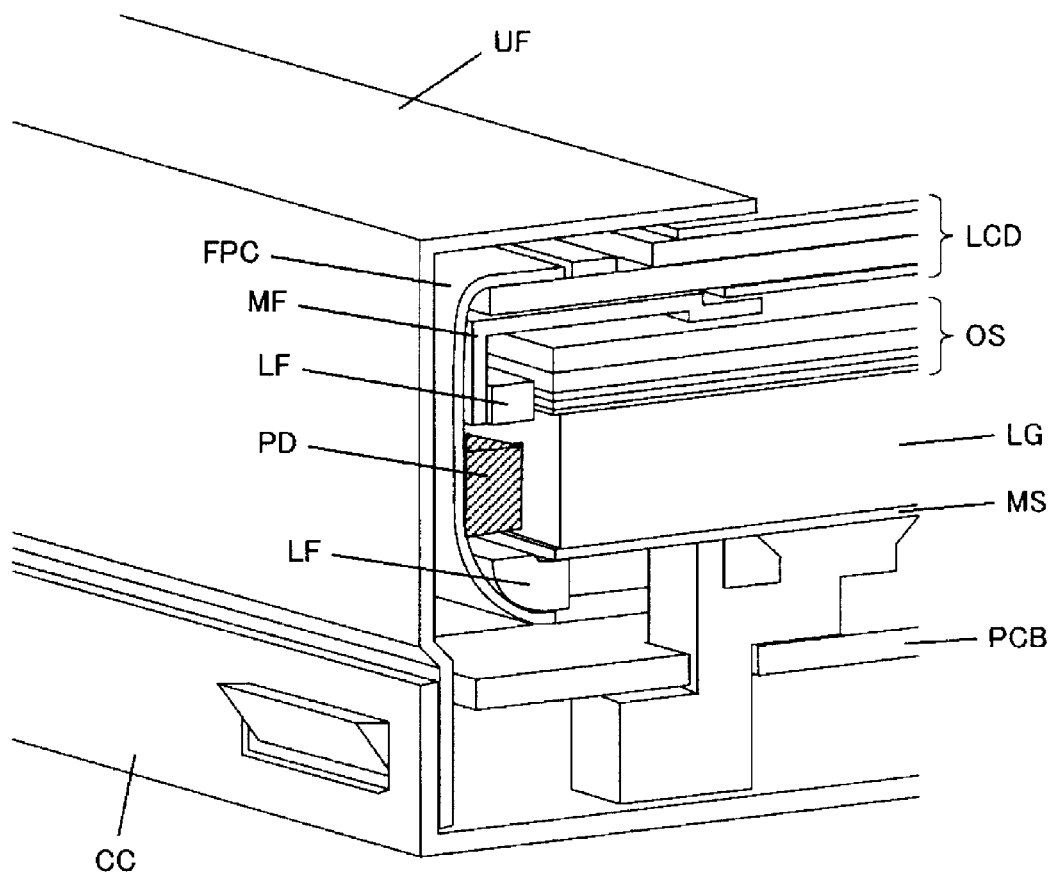
FIG. 8 is a perspective diagram with a cross-section for illustrating the entire structure of the liquid crystal display device according to the first embodiment of the present invention.

FIG. 8 is a perspective cross-sectional diagram for illustrating the entire structure of the liquid crystal display device according to the first embodiment of the present invention, which is a perspective cross-sectional diagram showing the region around the cross-section along line A-A' in FIG. 1.

In the liquid crystal display device according to the first embodiment, as is clear from FIG. 8, a flexible printed circuit board FPC for inputting a control signal to the liquid crystal display panel LCD is placed along the sidewall on the inside of the upper frame UF that is placed on the outside of the liquid crystal display panel LCD, and a photosensor PD is mounted on the flexible printed circuit board FPC on the side opposite to the upper frame UF in such a manner that the photosensor PD is inserted into the sensor hole PDH which is provided in the respective sidewall portion of the lower frame LF and the middle frame MF from the outside of the respective frames. That is to say, the photosensor PD is mounted on the flexible printed circuit board FPC on the lower frame LF side, and at the same time, a sensor hole PDH where the photosensor PD is mounted is created in the sidewall portions of the middle frame MF and the lower frame LF in the region where the flexible printed circuit board FPC is wired so that the photosensor PD is placed inside the sensor hole PDH in the structure, and therefore, the frame region can be prevented from increasing as the photosensor PD is mounted, even in the case where the photosensor PD is mounted in the frame region in a side portion. Accordingly, it is possible to gain such effects that the frame region in a side portion can be reduced, even in the structure where the photosensor PD is mounted in the frame region. In addition, the sidewalls of the light guide plate LG can be made flat, and thus, light that has entered into the light guide plate LG from the light emitting diodes LED, which are the light source, can be converted to uniform surface backlight.

In addition, as is clear from FIG. 8, whether or not the sensor hole PDH is provided in the lower frame LF and the middle frame MF needs to be changed depending on whether or not the photosensor PD is mounted in the liquid crystal display device, and it is possible for the rest of the structure to be the same, that it to say, to be made of the same materials, irrespective of whether or not the photosensor PD is mounted. Accordingly, such particular effects can be gained that the liquid crystal display device can be formed to have the same external size irrespective of whether or not a photosensor PD is mounted, and at the same time, a frame region having the same size can be provided.

Furthermore, the structure allows the photosensor PD to be mounted (attached) on the sidewall outside of the lower frame LF for containing the reflective sheet MS, the light guide plate LG and the optical sheet OS, that is to say, outside of the middle frame MF. Accordingly, even in the case where a problem arises such that the photosensor PD becomes out of order, the photosensor PD can be easily replaced without taking apart the backlight unit that is formed of a great number of components, and thus, such particular effects can be gained that measures against problems can be taken.

Figure 9:
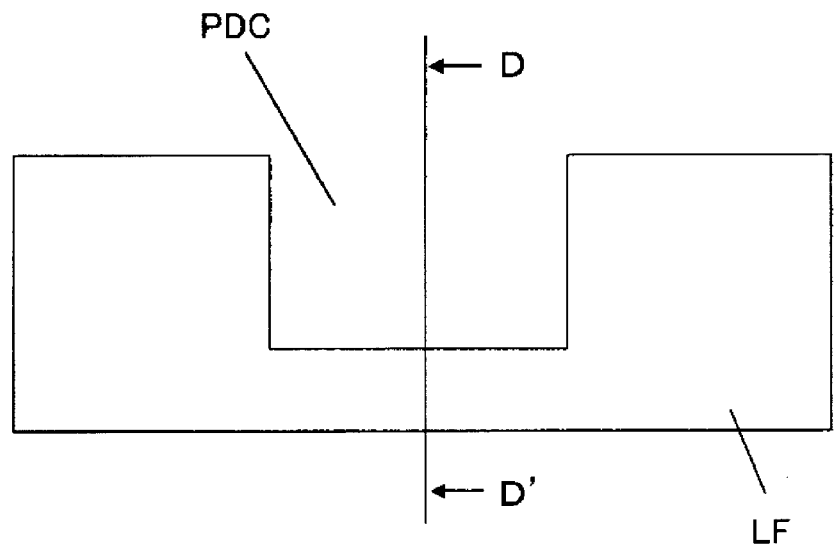
FIG. 9 is a diagram showing an enlargement of the portion with a notch that can be created in the lower frame in the liquid crystal display device according to the first embodiment of the present invention.
Figure 10:
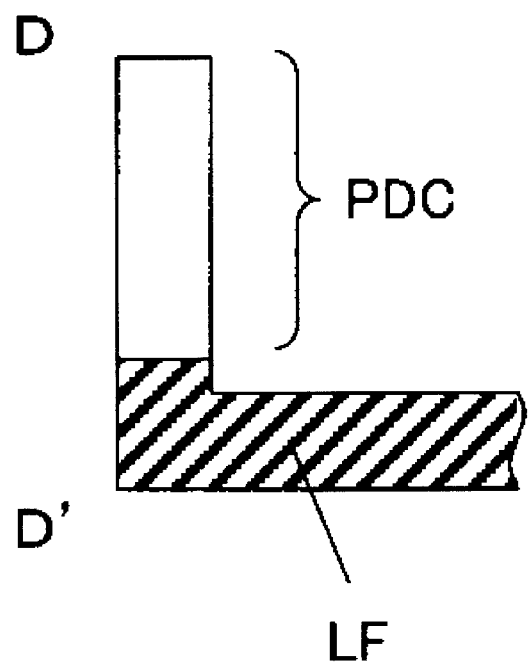
FIG. 10 is a cross-sectional diagram along line D-D' in FIG. 9.

Though in the liquid crystal display device according to the first embodiment the photosensor PD is provided by being inserted into the sensor hole PDH created in the lower frame LF and the middle frame MF, the location of the photosensor PD is not limited to the hole created in the sidewalls of the lower frame LF and the middle frame MF. As shown in FIG. 9, for example, a notch PDC may be provided in the lower frame LF and the middle frame MF so that the photosensor PD can be provided in this notch PDC in the structure. As shown in FIG. 10, which is a cross-section along line C-C' in FIG. 9, the notch PDC that continues from the opening side of the flat portion may be created in the sidewalls of the lower frame LF and the middle frame MF, and thus, it is possible to provide the photosensor PD. Here, the sensor hole PDH and the notch PDC may be combined in the structure in such a manner that the notch PDC is provided in the lower frame LF and the sensor hole PDH is provided in the middle frame MF, for example.

<Second Embodiment>

Figure 11:
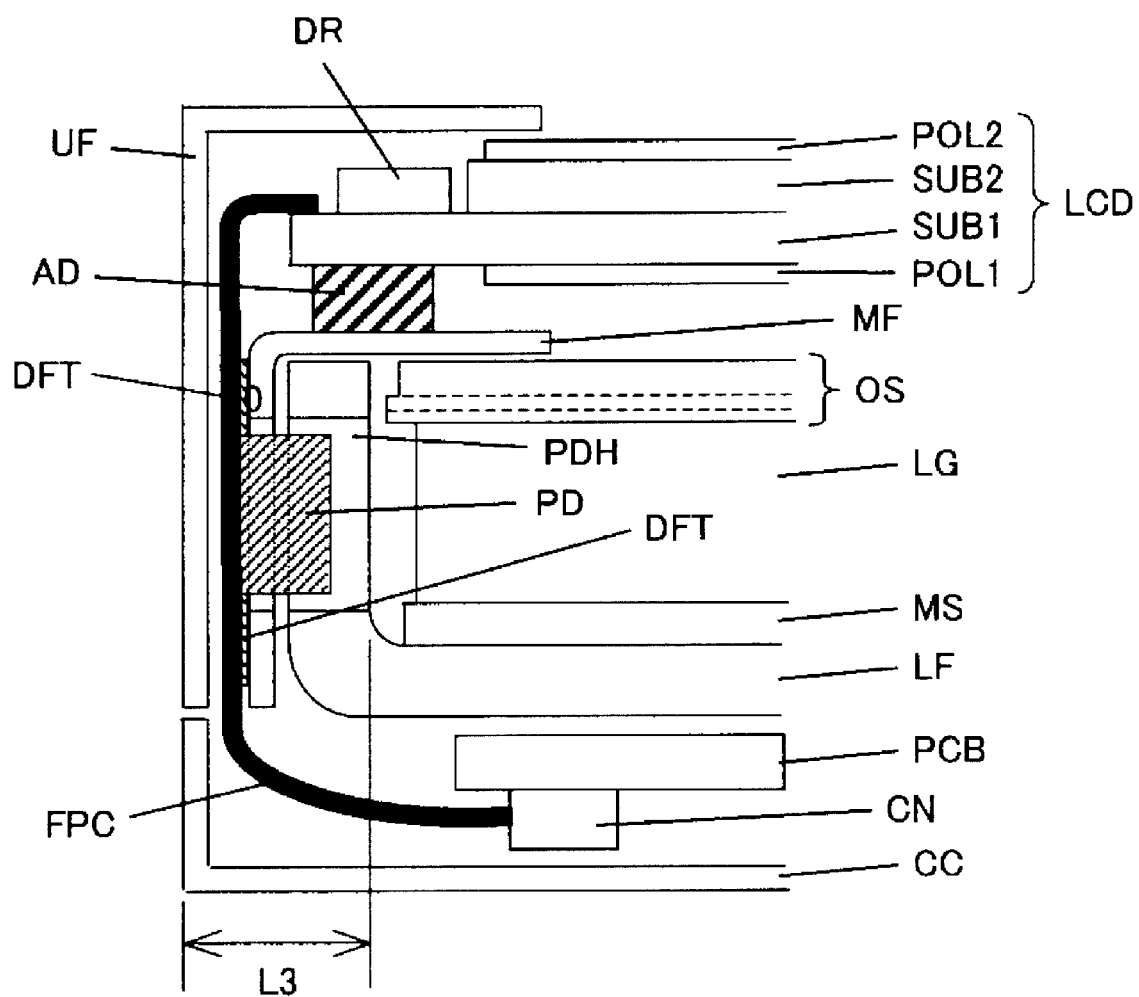
FIG. 11 is a cross-sectional diagram for illustrating the structure of the portion to which a photosensor is attached in the liquid crystal display device according to the second embodiment of the present invention.

FIG. 11 is a cross-sectional diagram for schematically illustrating the structure of the liquid crystal display device according to the second embodiment of the present invention, which is a diagram corresponding to FIG. 3 showing the first embodiment. Here, the liquid crystal display device according to the second embodiment has the same structure as the liquid crystal display device according to the first embodiment, except the structure where the flexible printed circuit board FPC is fixed to the middle frame MF using a two-sided adhesive tape DFT. Accordingly, in the following, the securing of the flexible printed circuit board FPC using a two-sided adhesive tape DFT is described in detail.

In the liquid crystal display device according to the second embodiment as well, as shown in FIG. 11, a backlight unit is formed by securing a reflective sheet MS, a light guide plate LG and an optical sheet OS to the lower frame and the middle frame MF. A liquid crystal display panel LCD is placed on the front side of the backlight unit, that is to say, on the surface side that is illuminated with the backlight, and is secured to the frame region of the middle frame MF using an adhesive tape AD. In addition, a power supply circuit PCB is provided on the rear side of the backlight unit and is electrically connected to the liquid crystal display panel LCD through the flexible printed circuit board FPC. An upper frame UF is provided on the display side of the liquid crystal display panel LCD, and the power supply circuit PCB is covered by a substrate cover CC.

The flexible printed circuit board FPC is placed between a sidewall portion of the upper frame UF and a sidewall portion of the middle frame MF, and a photosensor PD is mounted on the surface of the flexible printed circuit board FPC on the middle frame MF side. At this time, the flexible printed circuit board FPC is wired along the location where the photosensor PD is provided in the structure, and a sensor hole PDH is created in the respective sidewall portions of the middle frame MF and the lower frame LF in the location where the photosensor PD is provided, and thus, the photosensor PD on the flexible printed circuit board FPC is placed in the sensor hole PDH in the structure.

At this time, the liquid crystal display device according to the second embodiment has such a structure that the flexible printed circuit board FPC on which the photosensor PD is mounted is secured to the sidewall of the middle frame MF using a two-sided adhesive tape DFT. At this time, the points where the adhesive tape DFT is provided are on the upper and lower sides of the location on which the photosensor PD is mounted. That is to say, two points of the flexible printed circuit board FPC that are away from each other in the longitudinal direction are fixed so that the flexible printed circuit board FPC on which the photosensor PD is mounted is secured to the sidewall portion of the middle frame MF. Here, the points for securing using the adhesive tape DFT are not limited to two, and the location of the secured points may be other places, such as on both sides of the photosensor PD. In addition, the securing of the middle frame MF to the flexible printed circuit board FPC is not limited to the use of an adhesive tape DFT, and other means, such as a different adhesive, may be used.

In this structure, the liquid crystal display device according to the second embodiment can gain, in addition to the effects gained in the first embodiment, such effects that the force applied to the flexible printed circuit board FPC when the location at which the photosensor PD is attached shifts due to temperature change, the flexible printed circuit board FPC is connected to the liquid crystal display panel LCD, and the upper frame UF is attached, can be prevented from being applied to the photosensor PD as stress. As a result, such defects as that where the photosensor PD is peeled off from the flexible printed circuit board FPC due to stress can be prevented.

In addition, the photosensor PD and a wall of the sensor hole PDH can be prevented from making contact with each other when the photosensor PD moves due to vibrations, and therefore, stress can be prevented from being applied to the photosensor when the liquid crystal display device is used, and thus, the reliability of the photosensor PD can be increased.

In addition, such effects that the measured value can be prevented fluctuating because of the photosensor PD having moved due to vibrations can be gained.

Furthermore, the sensor hole PDH that penetrates from the middle frame MF to the lower frame LF can be clogged with the flexible printed circuit board FPC and the adhesive tape DFT, and therefore, such particular effects can be gained that a foreign substance, such as dust, can be prevented from entering into the backlight unit, that is to say, into the liquid crystal display device, through the sensor hole PDH.

Though in the liquid crystal display devices according to the first and second embodiments the backlight unit is formed of the lower frame LF and the middle frame MF where the liquid crystal display panel LCD is mounted on the backlight unit and is secured by the upper frame UF in the structure, the invention is not limited to this. The invention can be applied to a liquid crystal display device having such a structure that a reflective sheet MS, a light guide plate LG and an optical sheet OS are contained in a lower frame LF, and at the same time, a liquid crystal display panel LCD is mounted in the layer above the lower frame LF, and an upper frame UF is engaged with the lower frame LF from the display side of the liquid crystal display panel LCD, for example.

Though the liquid crystal display devices according to the first and second embodiments are appropriate for use in cars where the temperature range in the environment that they are used in is wide, the above-described effects can be gained even in the case of other applications of the liquid crystal display device.

Though the invention made by the present inventor is described in detail on the basis of the above-described embodiments, the present invention is not limited to these embodiments, and various modifications are possible as long as the gist of the invention is not deviated from.

What is claimed is:

1. A liquid crystal display device, comprising: a light guide plate for converting light from a light source into backlight for illumination; a first frame for containing said light guide plate; and a liquid crystal display panel provided over said light guide plate, wherein
    the light guide plate has a main surface which faces the liquid crystal display panel, and a plurality of sidewalls which intersect the main surface,
    the liquid crystal display device further comprises a photosensor that is placed so as to face one of the sidewalls of said light guide plate and detect an amount of said backlight, and
    said photosensor is placed so as to face the sidewall of said light guide plate through a hole or a notch created in a sidewall portion of said first frame, the sidewall portion of said first frame facing the sidewall of said light guide plate.

2. The liquid crystal display device according to claim 1, wherein
    the liquid crystal display device further comprises a second frame having a frame portion in frame form that extends from the periphery to a first surface so that an opening through which said backlight for illumination is emitted is created, and a second surface that faces said first surface is defined as an opening along a sidewall portion,
    said second frame has a hole or a notch in a sidewall portion that is connected to the hole or the notch in the sidewall portion of said first frame when said first frame and said second frame are engaged with each other, and said photosensor is placed so as to face the sidewall of said light guide plate through the hole or the notch that passes through the sidewall portions of said first and second frames.

3. The liquid crystal display device according to claim 1, wherein the liquid crystal display device further comprises a flexible printed circuit board for inputting a video signal to said liquid crystal display panel, and said photosensor is placed on said flexible printed circuit board.

4. The liquid crystal display device according to claim 3, wherein said flexible printed circuit board is fixed to the sidewall portion of said first frame by means of an adhesive.

5. The liquid crystal display device according to claim 1, wherein the detection side of said photosensor is placed in said hole or said notch.

6. The liquid crystal display device according to claim 1, wherein said light source is placed so as to face a sidewall of said light guide plate, and said photosensor is placed so as to face a sidewall of said light guide plate that is different from the sidewall where said light source is placed.

* * * * *